(12) United States Patent
Meyer et al.

(10) Patent No.: US 7,870,259 B2
(45) Date of Patent: *Jan. 11, 2011

(54) METHOD AND TRANSMITTER FOR AN EFFICIENT PACKET DATA TRANSFER IN A TRANSMISSION PROTOCOL WITH REPEAT REQUESTS

(75) Inventors: Michael Meyer, Aachen (DE); Janne Peisa, Espoo (FI); Bela Rathonyi, Malmö (SE); Joachim Sachs, Aachen (DE); Stefan Wager, Espoo (FI); Toomas Wigell, Espoo (FI)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1586 days.

This patent is subject to a terminal disclaimer.

(21) Appl. No.: 10/479,268

(22) PCT Filed: May 24, 2002

(86) PCT No.: PCT/EP02/05748

§ 371 (c)(1), (2), (4) Date: Dec. 1, 2003

(87) PCT Pub. No.: WO02/100030

PCT Pub. Date: Dec. 12, 2002

(65) Prior Publication Data

US 2004/0148396 A1 Jul. 29, 2004

(30) Foreign Application Priority Data

Jun. 1, 2001 (EP) .................................. 01113346

(51) Int. Cl.
*H04B 1/44* (2006.01)
*G06F 15/16* (2006.01)
*G06F 15/173* (2006.01)
*G06F 15/177* (2006.01)

(52) U.S. Cl. ...................... 709/227; 370/282; 370/469; 370/231

(58) Field of Classification Search ......... 709/217–228; 370/282, 469, 231
See application file for complete search history.

(56) References Cited

U.S. PATENT DOCUMENTS 6,546,425 B1 * 4/2003 Hanson et al. ............... 709/227

(Continued)

OTHER PUBLICATIONS

3GPP TS 25.322 Version 4.0.0 Release 4. "Universal Mobile Telecommunications System (UMTS); RLC Protocol Specification". ETSI TS 125 322 V4.0.0, Mar. 2001, pp. 1-57, XP002180710, Sophia Antipolis, FR cited in the application.

(Continued)

*Primary Examiner*—Haresh N Patel
(74) *Attorney, Agent, or Firm*—Roger S. Burleigh

(57) ABSTRACT

In a method for the transmission of data packets (D) from a transmitter (TR) to a receiver (RE) identification of transmitted data packets are stored. Defective data packets (D) are detected by the receiver (RE), status messages (S) which request defective data packets for retransmission are sent from the receiver (RE) to the transmitter (TR) and retransmissions of requested data packets are performed according to the status messages (S). The transmitter (TR) evaluates a first status message ($S_{11}$) with an identification of at least one first requested data packet and retransmits the first data packet. The transmitter (TR) then initializes a timing unit according to the retransmission of the first data packet, wherein the timing unit or a threshold for the timing unit is attributable to the first data packet. When the transmitter evaluates a further status message ($S_{12}$) and detects at least one further data packet that is requested for a retransmission, it selects the further data packet if the timing unit has reached the threshold or if the identification of the further data packet is different from the identification of the first data packets. Only the selected data packets are retransmitted. A transmitter and software programs embodying the invention are also described.

24 Claims, 4 Drawing Sheets

U.S. PATENT DOCUMENTS 6,947,394 B1 * 9/2005 Johansson et al. ............ 370/282
6,961,349 B2 * 11/2005 Malomsoky et al. ........ 370/469
6,992,982 B1 * 1/2006 Meyer et al. ................. 370/231
7,082,103 B2 * 7/2006 Schieder et al. ............. 370/231

PUBLICATIONS

Simmons J M. Proof of Correctness of ATM Retransmission Scheme. Computer Networks and ISDN Systems, North Holland Publishing. Amsterdam, NL. vol. 29, No. 2, 1997, pp. 181-194, XP004034004, ISSN: 0169-7552, Dec. 31.

* cited by examiner

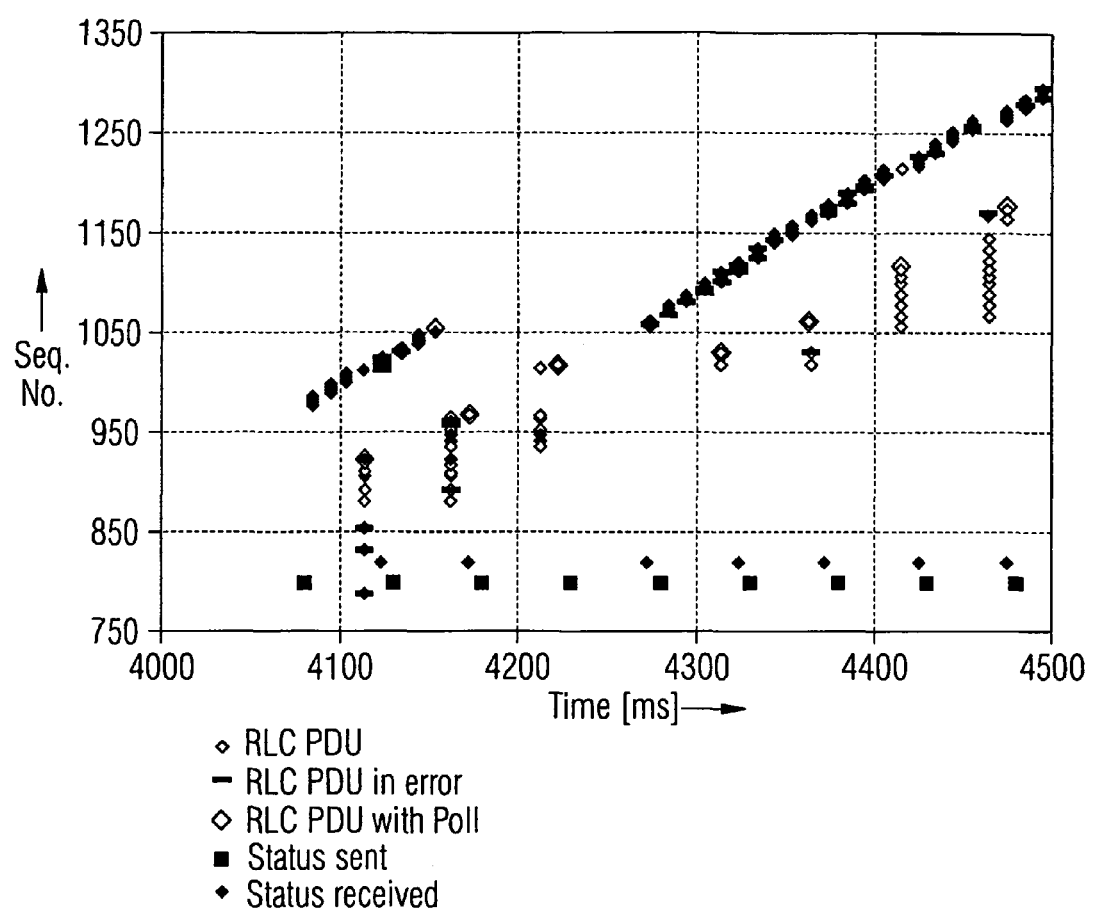

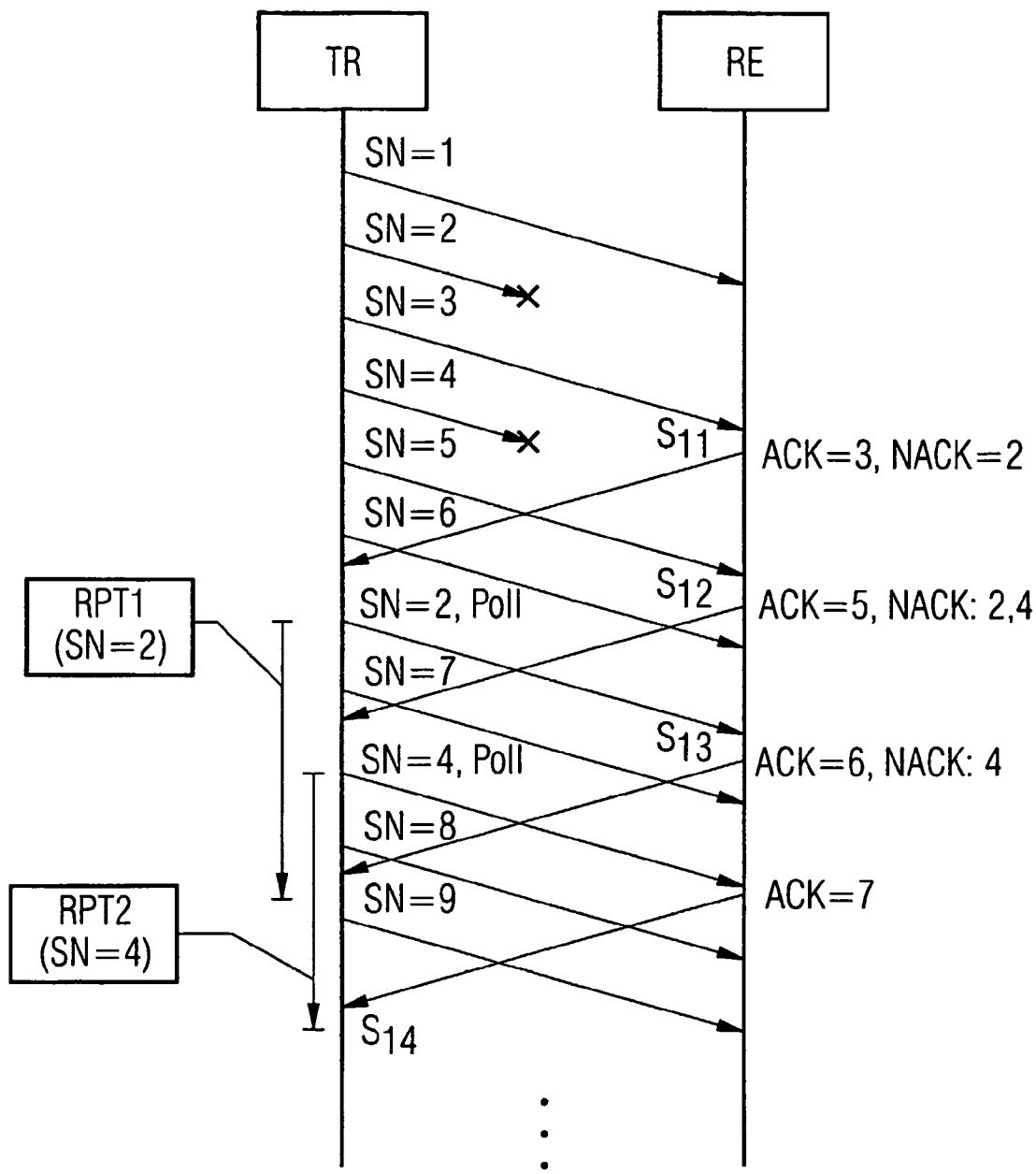

METHOD AND TRANSMITTER FOR AN EFFICIENT PACKET DATA TRANSFER IN A TRANSMISSION PROTOCOL WITH REPEAT REQUESTS

TECHNICAL FIELD OF THE INVENTION

The present invention relates, in general, to communications systems, and specifically, to methods to avoid unnecessary multiple transmissions and ensure low transmission delay.

BACKGROUND OF THE INVENTION

Different modes can be used for the transmission of data packets from a transmitter to a receiver, e.g. a transparent mode, an unacknowledged mode or an acknowledged mode. By using an ARQ (Automatic Repeat Request) mechanism, the acknowledged mode provides the possibility to retransmit data packets which are defective, either because they are lost or because they have been received in error. In this way, a loss free data transmission can be ensured for higher layers in a protocol stack although individual data packets of the ARQ layer are defective, e.g. due to a disturbed radio link. To allow an ARQ mechanism it is customary to identify the data packets by a sequence number which is generally attributed to the packets on a modulo basis. Messages from the receiver to the transmitter indicate which packets are defective and retransmissions of said packets are performed according to the messages. In addition, the messages can also acknowledge correctly received data packets.

The status of transmitted and received data packets can be controlled using receiver and transmission windows in the receiver and the transmitter, respectively, i.e. memories which store whether a data packet is acknowledged or not. The transmission window ranges from the first unacknowledged packet to the packet with the highest transmitted sequence number while the receiver window according to the definition used throughout this text ranges from the first unacknowledged packet to the packet with the highest received sequence number, generally under consideration of a modulo sequence numbering.

An example of a transmission protocol which has an acknowledged mode is the RLC (radio link control) protocol as described in the 3GPP technical specification 3G TS 25.322 V4.0.0 (2001-03) of the $3^{rd}$ Generation Partnership Project, Technical Specification Group Radio Access Network. The RLC protocol is used for the transmission of data in a WCDMA (Wideband Code Division Multiple Access) system, for example in the Universal Mobile Telecommunication System (UMTS).

In a communication system, the transmitter is for example a user equipment like a mobile phone or a network node like an RNC (Radio Network Controller). The RLC protocol layer in the transmitter receives packets, e.g. from a higher layer in the protocol stack. The packets from the higher layer are denoted as SDUs (Service Data Units). The RLC layer transforms the SDUs to data packets denoted as packet data units (PDU) to prepare them for transmission over a link between the transmitter and the receiver. In the RLC layer of the transmitter, packet transformations comprise for example a segmentation, concatenation or buffering of SDUs while PDUs can for example be padded or buffered. The receiver is usually a network node or a user equipment communicating with the transmitter. The RLC layer of the receiver performs an inverse processing to release the data either to a higher protocol layer or to forward it to a link layer for transmission through further domains of the communication system, for example through a core network of the communication system.

In the RLC protocol, the messages indicating defective data packets are denoted as status reports and may consist of one or several protocol data units. The RLC specification requires that a status report shall include information about all protocol data units that have been received and all units detected as defective. Accordingly the receiver is reporting at the time when a status report is generated about all protocol data units which are currently in the receiver window. To improve the protocol performance in terms of delay and throughput optimization it is necessary that retransmissions of erroneously received radio link control protocol data units are sent as soon as possible. However, fast retransmissions may result in several retransmissions of the same PDU which is a waste of resources. Several status reports within one radio link control (RLC) round trip time trigger each the retransmission of a particular defective protocol data unit because all negatively acknowledged protocol data units are retransmitted when the transmitter receives a status report. Especially if status reports are sent as often as possible this may speed up the protocol but triggers unnecessary retransmissions.

The RLC protocol allows to control the amount of status reports by a Status Prohibit Timer. This timer prohibits the sending of status reports for a certain amount of time. If the Status Prohibit Timer is set higher than the RLC round trip time, unnecessary retransmissions are prevented. The disadvantage is that this slows down the retransmission of erroneous data packets significantly and results in a slow protocol, especially for a high proportion of defective packets and high round trip times. An alternative to avoid unnecessary retransmissions is the estimated PDU counter (EPC) as described in 3GPP specification 3G TS 25.322. The EPC mechanism comprises both a timer to consider the round trip time and in addition a counter corresponding to the number of packets requested for retransmission. The counter eliminates the influence of the link capacity on the transmission time but the EPC mechanism also does not solve the problem that the protocol is slowed down by the timer.

As a result, current protocols comprising a retransmission of data packets provide basically two options which either waste resources or slow down the protocol. Neither option provides an optimal performance.

Besides these problems, the existing technology can also disadvantageously affect the transport layer above the ARQ layer, in particular TCP (Transmission Control Protocol). TCP is a higher layer protocol which is widely used to provide a reliable data transfer in communication networks, for example in the Internet. Interactive transport protocols like TCP control transmissions according to reply messages from the receiving to the transmitting entity. Control procedures can adapt the transmitted data rate according to the reply messages, e.g. if a time-out for a reply indicates a packet loss. A radio link control protocol which is contributing to a large transport layer round trip time is therefore not only disadvantageous in itself. The high delay can furthermore trigger control procedures of the transport layer, even if a time-out results from a radio link round trip time and not from a packet loss in the network. As a result the existing RLC protocol is often too slow to support high TCP throughputs although the underlying physical layer would allow a corresponding data rate.

Finally, a large round trip time can cause a stalling condition of the transmission window in case of a limited window size, e.g. if a modulo sequence numbering is used. In a stalled window all positions are attributed to data packets. The window can not be shifted and new data packets accordingly not be sent until the oldest defective data packet is acknowledged. This blocks the data transmission.

SUMMARY AND DESCRIPTION OF THE INVENTION

It is an object of the present invention to obviate the above disadvantages and provide a method and a transmitter for an improved transmission of data packets in a communication system. It is especially an object to avoid unnecessary multiple transmissions and ensure a low transmission delay.

According to the invention, the method described in claim 1 is performed. Furthermore, the invention is embodied in a transmitter and a program unit as described in claims 14 and 17. Advantageous embodiments are described in the further claims.

In the proposed method for the transmission of data packets from a transmitter to a receiver, defective data packets are detected by the receiver. Status messages which request defective data packets for retransmission are sent from the receiver to the transmitter and retransmissions of requested data packets are performed according to the status messages. Preferably, the data packets are stored in the transmitter for this purpose until an acknowledgement of a successful transmission is received. A first status message with an identification, for example the sequence number, of at least one first requested data packet is evaluated by the transmitter which performs a retransmission of the first data packets and initializes a timing unit according to the retransmission.

The initialization can for example be the starting of a timer or the reset of a counter. For example, a first timer or a counter can be started when the first data packet is forwarded for transmission to an underlying layer in the protocol stack or when the transmission is started by a physical layer. The timing unit, a threshold for the timing unit or both are attributable to the data packet, e.g. using a memory storing the relation or using an identification of the threshold or timing unit according to the identification of the data packet or the status message.

The purpose of the timing unit and the threshold is that the transmitter does not retransmit those defective data packets which are requested in a further status message but for which an acknowledgement for the first retransmission can not have reached the transmitter due to the round trip time. The timing unit preferably reaches the threshold after one round trip time, which can for example be represented by a pre-configured constant value of a counter or timer or by a measured round trip time between the transmitter and the receiver. A setting of the threshold corresponding to a slightly higher value than one round trip time can allow for variations and increases the stability of the proposed method.

When the transmitter evaluates a further status message and detects at least one further data packet that is requested for a further retransmission, it selects the further data packet if the timing unit has reached the threshold or if the identification of the detected data packet is different from the identification of the first data packet. For this purpose, it is possible to use the identifications of transmitted data packets not yet acknowledged by the receiver which are stored in the transmitter to monitor the transmissions, e.g. in a transmission window. If the timing unit corresponds to more than one first data packet, the further data packet is only selected if the identity is different from all first data packets.

Only the data packets selected out of those requested in the further status message are retransmitted, i.e. those data packets which are for the first time requested for a retransmission and those for which the timing unit has reached the threshold.

It is sufficient if one condition is fulfilled, i.e. the respective other condition for the selection of a requested data packet needs not to be checked in this case. For example after the threshold is reached a packet can be retransmitted without a check whether it was requested before. According to the sending of the further data packet a further threshold can be defined, e.g. as a pre-configured constant or a measured value as described above. The further threshold is evaluated in the same way as the first threshold for still further status messages in comparison to the same or a further timing unit. This allows to process still further status messages before the first and further thresholds are reached but in any case only those defective data packets are retransmitted which were either not requested in any former status message or for which the corresponding threshold is reached or passed.

The invention speeds up the radio link control protocol by allowing early requests for retransmission of defective data packets while avoiding unnecessary retransmissions. Status messages can be sent as frequently as suitable to speed up retransmissions. The time between two subsequent status messages, e.g. between the first status message and the further status message, is preferably lower than a round trip time between the transmitter and the receiver. With increasing number of status messages per round trip time, the overall transmission delay of the protocol by defective data packets is reduced.

A further retransmission of already requested data packets is prevented by the threshold which represents the expected arrival of the acknowledgement for a first retransmission at the tranmitter. An early retransmission has the advantage that the data traffic is less bursty, i.e. the variations in the intervals between data delivery to higher layers are reduced, especially in case of an in-order delivery of data packets by the proposed protocol to the higher layer. The processing requirements for all devices in a connection can be decreased in this way. The method according to the invention is robust against status message loss, i.e. in case of a defective status message a retransmission of a requested data packet is only delayed until the next status message, i.e. typically less than one round trip time. The proposed method is especially beneficial for TCP traffic and reduces the probability of a stalling transmission window significantly for a high frequency of status messages.

The invention can for example be implemented in a network node adapted to set up connections with user equipment, e.g. in a radio network controller RNC or in a radio base station, depending on the node in which the protocol controlling transmissions over the link is terminated. It is also advantageous to implement the invention in the user equipment in order to speed up uplink traffic from the user. Preferably the proposed method is implemented at both ends of the link because generally both sides can be the transmitter. It is however also possible to implement the method only in one transmitter, especially on the side of the link by which most data traffic is sent which is typically the uplink side. It is especially advantageous that adaptations of the receiver are not required.

In an advantageous embodiment of the method, the timing unit is a first timer which is attributable to the identification of the first data packet. In this case the initialization is a starting of the first timer according to the sending of the first data packet and the threshold is the expiry of the first timer. It is possible to use a different timer for every retransmitted data packet and set the expiry value to the round trip time. It is also an option to use a single timer for all retransmitted data packets and set the expiry threshold to the timer value at the retransmission of the data packet plus the expected round trip time. The use of timers allows a very precise implementation of the proposed method.

To limit the number of timers required for the method, an advantageous timer comprises a threshold timer with a threshold set to an expiry value. In addition, the timing unit comprises an interval timer. The threshold timer and the interval timer are started according to the retransmission of the first data packet. When a subsequent data packet is retransmitted, the value of the interval timer is stored and the interval timer is reset and restarted. The threshold timer is reset and restarted when it reaches the expiry threshold and the expiry threshold is set to the stored value of the interval timer. The procedure can be repeated for any subsequent retransmission. In this way, any number of data packet s can be tracked with a single timing unit.

Alternatively, the timing unit can comprise a counter for transmitted packets and the threshold is a counter value. The selection of requested data packets for retransmission can in this case be all requested packets from one or more intervals defined with respect to the present value of a transmission variable, especially the sequence number of the upper border of a transmission window, and the threshold value. This allows a simple implementation of the invention and is suitable especially for constant data rates while a varying date rate can cause errors unless the variations are monitored and corrections for the variations are applied.

Preferably, at least two timing units and/or thresholds are attributable to data packet identifications. The transmitter performs a check of thresholds for all timing units and thresholds before performing a retransmission. In this way, multiple status messages can be processed during a round trip time without risk of unnecessary retransmissions.

Preferably, one timing unit and/or threshold is attributable to several retransmitted data packets. In this way, the processing requirements can be reduced if the same timing unit or threshold or both correspond to several data packets which are retransmitted almost simultaneously. Especially, a timing unit can be attributed to the data packets retransmitted within one transmission time interval (TTI).

It is often advantageous to request the retransmission of data packets in sets because communication devices can be simplified in this way and the probability for groups of transmission errors is high, e.g. due to a radio link which is disturbed for a short period of time. In this case, all steps in the proposed method are performed for the corresponding sets instead of single data packets. A set can consist for example of all data packets transmitted in one TTI.

An advantageous threshold preferably corresponds to approximately one round trip time to avoid unnecessary retransmissions without slowing down the protocol. If the round trip time can vary, a value higher than the average round trip time reduces the probability of unnecessary retransmissions while increasing the delay. The most preferable option is therefore to set the threshold, e.g. the timer expiry, to a value corresponding to a slightly higher time than one round trip time to allow for variations and ensure a high stability of the proposed method i.e. to adapt the threshold by a correction value for the round trip time. A suitable magnitude of the correction value can depend on different parameters like the proportion of retransmissions.

In many transmission systems data can be transmitted over channels with different properties. Especially, transmissions of a user in a communication system are performed either over a channel dedicated to the user or over a shared channel. On a dedicated channel the user has generally a defined bandwidth and delay for transmissions. These parameters can be different for another dedicated channel and they may vary for a shared channel, e.g. according to the behavior of other users in the communication system. It is advantageous that the threshold for a timing unit is determined according to the properties of the channel used for data transfer. In this way further retransmissions can be performed faster on a channel with low delay. A threshold independent of the channel properties is more simple to configure but can introduce unnecessary delays.

The proposed method is especially advantageous for implementation in an RLC layer of the transmitter, i.e. if the packets are RLC protocol data units.

It is also advantageous to use the proposed method for the data packets of a physical layer in a protocol stack. This is especially beneficial for the HSDPA (High speed downlink packet access) evolution of WCDMA which uses an ARQ mechanism on the physical layer of the protocol stack. In HSDPA a hybrid ARQ mechanism can be applied in which erroneous data packets are not discarded but information from different transmissions of the same packet can be combined to reconstruct the packet. Especially in this case, it is often advantageous if the original and the retransmitted data packet are not identical but they may for example be coded in a different way to improve the probability of correct decoding after combining the original transmission and the retransmission. The method can be used both for downlink and uplink traffic. On the network side of the wireless link, the protocol is preferably implemented in a radio base station to speed up the traffic. If the method is used on the physical layer this can either be an alternative to the application on a higher layer, e.g. RLC, or as a backup solution in which the method is used both on the physical layer and a higher layer.

A transmitter for a communication system for the transmission of data packets according to an ARQ mechanism comprises a memory to store an identification of transmitted data packets, an interface with transmission and reception units to exchange messages with a receiver and a processing system adapted to evaluate status messages from the receiver which request defective data packets for retransmission and to initiate retransmissions of requested data packets according to the status messages.

According to the invention, the processing system evaluates a first status message with an identification of at least one first requested data packet and initiates a retransmission of the first data packet or packets. A timing unit is initialized according to the retransmission of the first data packets. The timing unit or a threshold for the timing unit or both are attributable to the data packet. When the processing system evaluates a further status message it can detect at least one further data packet that is requested for a further retransmission. The processing system selects the further data packet if the timing unit has reached the threshold or if the identification of the further data packet is different from the identification of the first data packets. Retransmission are initiated only of the selected data packets. The above steps can for example be executed by software loaded into the processing system of the transmitter. The transmitter is preferably adapted to perform one or several of the embodiments of the method described.

The transmitter is for example a radio base station, a user equipment or a radio network controller (RNC). The same entities can also be a receiver in the proposed method.

A program unit according to the invention can for example be stored on a data carrier or loadable into a transmitter in a communication system, e.g. as a sequence of signals. The program unit can comprise code for performing any embodiment of the described method.

The foregoing and other objects, features and advantages of the present invention will become more apparent in the following detailed description of preferred embodiments as illustrated in the accompanying drawings.

BRIEF DESCRIPTION OF THE DRAWINGS

FIG. 2 shows an example of transmitted RLC packets during an interval of time FIG. 3 shows the handling of data packets according to the invention

DETAILED DESCRIPTION OF PREFERRED EMBODIMENTS OF THE INVENTION

Figure 1A:
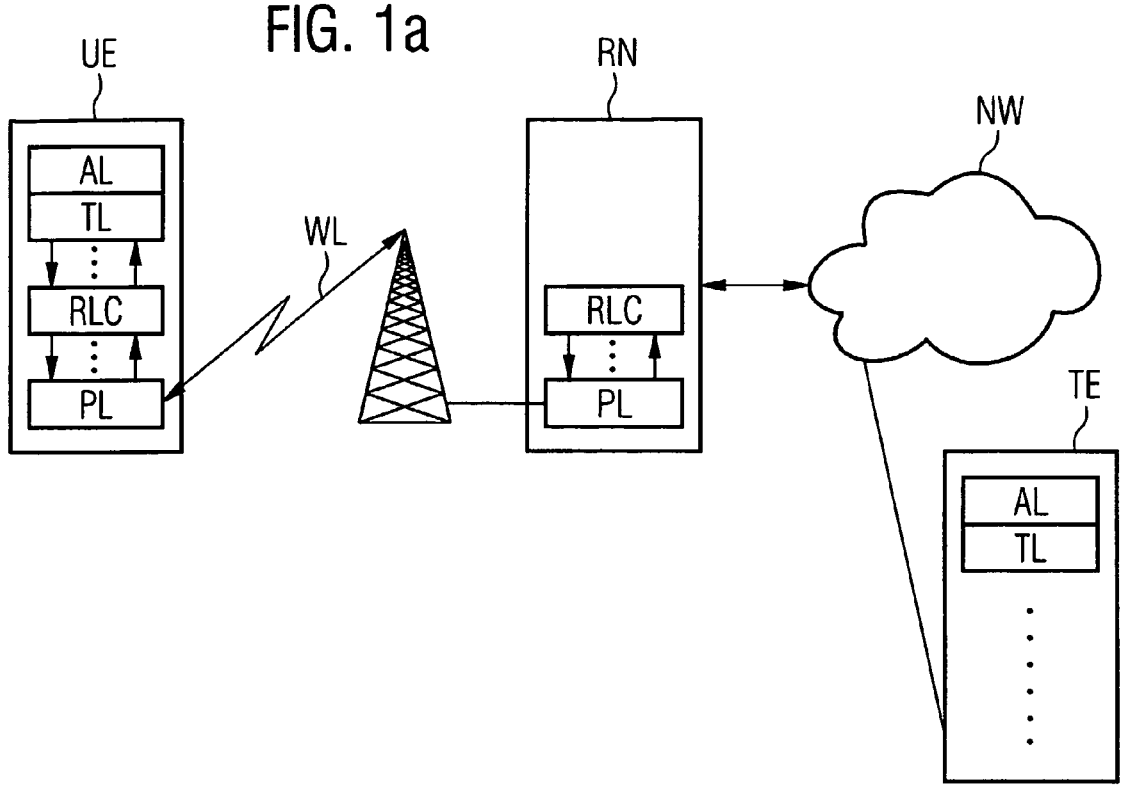
FIG. 1 shows a radio link in a wireless communication system in two different representations

FIG. 1a illustrates a transmission system comprising a wireless link WL. The link WL connects a user equipment UE, for example a mobile phone or another terminal, and a radio network node RN, for example an RNC or a base station. Further equipment necessary for the connection is omitted for clarity, e.g. in case that the node RN is an RNC the wireless link extends between the user equipment UE and a radio base station which is in turn connected to the RNC. Both the user equipment UE and the node RN can be the transmitter or the receiver of the present invention, depending on the direction in which data packets are sent over the wireless link WL.

User equipment UE and network node RN comprise processing systems in which at least parts of a protocol stack for the transmission of data is implemented. The processing stack in the example comprises an application layer AL for executing applications, a transport layer TL, e.g. implementing TCP, a radio link control layer RLC and a physical layer PL. Further layers which are not depicted can also be present in the protocol stack as indicated by dots, e.g. a UMTS system comprises a MAC (Medium Access Control) layer between the RLC and the physical layer PL.

The user equipment UE in the example communicates with an application running in a further terminal equipment TE, for example a server. The application layer AL and the transport layer TL are terminated in the further terminal equipment TE. The data packets between user equipment and terminal equipment are sent via the node RN and one or more intermediate networks NW, e.g. the core network of a communication system. Data packets of the transport layer TL are transferred to the RLC layer for transmission over the wireless link WL. The behavior of the RLC packets on the wireless link, especially the delays introduced by the properties of the RLC layer and all underlying layers, affects the performance of the higher layers TL, AL in the protocol stack.

Figure 1B:
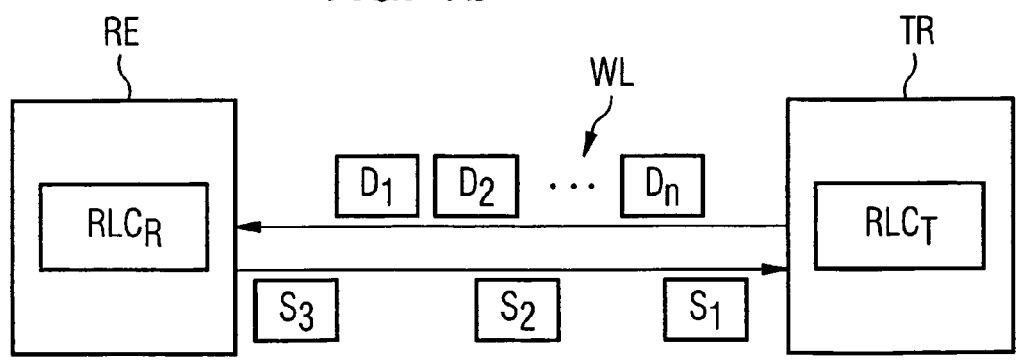

In FIG. 1b a model of the communication over the wireless link WL is shown from the perspective of the RLC layer. The RLC entity RLCT in the transmitter TR sends data packets $D_1 \ldots D_n$ to the RLC entity $RLC_R$ in the receiver RE by using underlying layers as described above. The receiving entity $RLC_R$ acknowledges the reception of correctly received data packets and requests the retransmission of defective data packets in a first status message $S_1$ which is sent back to the transmitter.

The RLC round trip time is the period from the sending of the first status message $S_1$, i.e. the forwarding to the underlying layer in the receiver RE, until the reception of the first requested data packet D, i.e. the time when this packet is forwarded from the underlying layer in the receiver RE to the RLC entity $RLC_R$. In more general terms, the RLC round trip time is the period until the RLC entity on one end of a link receives a response from the RLC entity on the other side. The RLC round trip time includes for example propagation delays on the link WL as well as processing delays for the transfer of data between different layers in the protocol stacks or over interfaces between nodes, e.g. between radio base station and RNC. According to the invention, several further status messages $S_2$, $S_3$ . . . can be sent within one round trip time while a single retransmission of a requested data packet can be ensured within a round trip time.

Status messages can either be initiated by the receiver or the transmitter can determine to request a status message S, e.g. by setting a poll bit in a data packet header. Any single condition described in the following or any combination of such conditions can be used to determine that a status message should be requested. Preferable conditions to trigger a status message are for example a predefined number of sent data packets, the sending of data packets from a predetermined fraction of a transmission window, the reaching of a threshold or a defined fraction of a threshold by a timing unit, especially the expiry of a timer. Also the end or beginning of a data packet from a higher layer of a protocol stack is a preferable condition to request a status message in order to avoid delays of packet delivery. It is possible in this case to consider only the beginning or end of every $n^{th}$ data packet from the higher layer. To avoid a stalling of the method, especially when packet counters are used for timing purposes, the last packet in a buffer or in a retransmission buffer is a suitable condition to request a status message. A separate retransmission buffer allows that retransmissions of data packets are performed with priority over those data packets which are to be transmitted for the first time.

FIG. 2 depicts a section of an RLC trace for a receiver, i.e. the reception of packets indicated by their corresponding sequence number over time. Status reports are triggered when a PDU is received in which a poll bit is set. In the example status reports are sent in intervals of 50 ms while the RLC round trip time is about 100 ms. On the link WL between transmitter and receiver some of the packets are lost or corrupted as indicated by horizontal bars. The status reports indicate to the transmitter which packets have to be resent.

In a transmission according to the state of the art, e.g. as required by standard 3G TS 25.322, a retransmission is sent for each negative acknowledgement received by the transmitter. The status report includes information about protocol data units that have been received and information about all PDUs detected as defective. If status reports are sent in shorter intervals than the radio link control round trip time as in the example, several status reports include the same protocol data unit.

The receiver in FIG. 2 sends a status report to the transmitter every 50 ms. Based on those status reports retransmissions are performed. The sequence numbers of the retransmitted packets are lower than the sequence numbers of those packets transmitted for the first time which allows to distinguish both kinds of packets in FIG. 2. All erroneously received packets are retransmitted twice because each is included in two status reports. For example, the same packets with sequence numbers around 950 are retransmitted both at the time 4165 ms and 4215 ms although the first retransmission of the packets was successful.

As a result there is generally one unnecessary retransmission for all negatively acknowledged protocol data units in FIG. 2 unless the first retransmission of a PDU is defective. If the interval between status reports is increased to avoid unnecessary retransmissions, this increases the total transmission delay. Furthermore, especially in the case of in-order delivery of data packets to higher layers, the traffic tends to be forwarded in bursts if few defective PDUs inhibit the forwarding of the data and several SDUs are released in a row when a PDU is received correctly after one or several unsuccessful retransmissions.

The steps of a method according to the invention is described below with respect to FIG. 3 which shows the messages sent between the RLC entities of the RLC transmitter TR and the RLC receiver RE. The vertical axis in FIG. 3 corresponds to the progress of time.

1. The RLC transmitter TR sends 3 PDUs with sequence numbers SN=1, 2 and 3.
2. The PDU with SN=2 is lost, e.g. due to a disturbance during radio transmission, and does not reach the RLC receiver.
3. By receiving the PDU with SN=3 the RLC receiver can detect the loss of the PDU with sequence number 2 if a transmission in the order of increasing sequence numbers is performed. The loss triggers a transmission of a first status report or status message $S_{11}$, which requests a retransmission of the PDU with SN=2. In the first status report $S_{11}$, the sequence number 3 is acknowledged (ACK=3) while sequence number 2 is reported as missing (NACK=2).
4. At the same time, the RLC transmitter continues sending PDUs with SN=4, 5 and 6, of which the PDU with SN=4 is again lost during radio transmission.
5. Upon receiving the first status report $S_{11}$, the RLC transmitter retransmits the PDU with SN=2. In the retransmitted PDU, a poll bit is set to request the transmission of a further status report by the receiver after reception. In this way, further delays are avoided if the retransmission is also lost. The transmitter TR starts a first retransmission prohibit timer RPT1 for this PDU and stores in a memory that sequence number SN=2 corresponds to the retransmission prohibit timer RPT1. The expiry threshold for the timer is set slightly higher than one round trip time.
6. When receiving the PDU with SN=5, the RLC receiver detects that the PDU with SN=4 is also lost and transmits a second status report $S_{12}$ which requests a retransmission both of the PDU with SN=2 and SN=4 by including the information (NACK: 2, 4) while the reception of the PDU with sequence number 5 is acknowledged (ACK=5). The PDU with SN=2 is included in the second status report $S_{12}$ since the receiver has not yet received it and is unaware that a retransmission is already on the way. If the PDU with SN=2 would not be included, a loss of the first status report $S_{11}$ could block or delay the transmission.
7. In reply to the second status report $S_{12}$ with the retransmission request for SN=2 and 4, the RLC transmitter only retransmits the PDU with SN=4. For sequence number SN=2 a check of the memory has the result that the first retransmission prohibit timer RPT1 is running for SN=2. The expiry threshold for this timer is not yet reached. Therefore, the PDU with SN=2 is not selected for retransmission. The poll bit is set in the retransmitted PDU with SN=4. The RLC transmitter starts a further retransmission prohibit timer RPT2 for SN=4, stores the correspondence between the timer and the PDU and sets the expiry threshold for the timer slightly higher than one round trip time.
8. When the RLC receiver receives the retransmission of SN=2, the poll bit is evaluated and the receiver sends a third status report $S_{13}$ which requests a retransmission of the PDU with SN=4 using the information NACK=4. In this way, the reception of the PDU with SN=2 is acknowledged because no further retransmission is requested.
9. When the third status report $S_{13}$ with a retransmission request for the PDU with SN=4 arrives at the RLC transmitter, again a check is performed in the memory whether any timer is attributed to this PDU. Retransmission prohibit timer RPT2 which is still not expired is detected to correspond to the PDU and, therefore, no retransmission is performed.
10. Upon receiving the retransmission of SN=4, the RLC receiver sends a fourth status report $S_{14}$ that acknowledges all PDUs up to and including SN=7 with the information ACK=7. The fourth status report $S_{14}$ is triggered by the poll bit in the retransmitted PDU with SN=4.

The above procedure is continued until all data packets are transferred. The number of necessary timers corresponds to the number of PDUs which are retransmitted before the expiry of the first timer. Using timers for sets of simultaneously retransmitted PDUs can reduce the required number.

A preferable option for the implementation of the timing unit comprises two timers, denoted interval timer and timeout timer in the following. The expiry value of the timeout timer corresponds to the threshold after which a data packet can be retransmitted a second time.

When a first data packet is retransmitted both timers are started with an indication that the timeout timer corresponds to the first data packet. If a second data packet is retransmitted before the timeout timer is expired, the present value of the interval timer is stored with an indication of the second data packet. The interval timer is reset and restarted. For any further data packet which is retransmitted before the timeout timer is expired, the present value of the interval timer is again stored with an indication of the corresponding data packet and the interval timer is again reset and restarted.

When the threshold value is reached by the timeout timer, this indicates that the first data packet can be retransmitted again if it is requested in a further status message. This indication can be stored with the first data packet or an indication of first the data packet can be removed from a list of data packets which are prohibited for retransmission. The timeout timer is attributed to the second data packet and restarted with the threshold set to the value of the interval timer stored for the second data packet, i.e. the timeout timer is set to expire after the stored interval timer value. When the threshold is reached again, the same procedure is repeated for any further data packet for which a value of the interval timer is stored. If the interval timer reaches the threshold of the timeout timer this indicates that any requested data packet can be retransmitted. This implementation of the timing unit limits the number of timers required for the tracking of the retransmissions while ensuring a precise timing.

Figure 4:
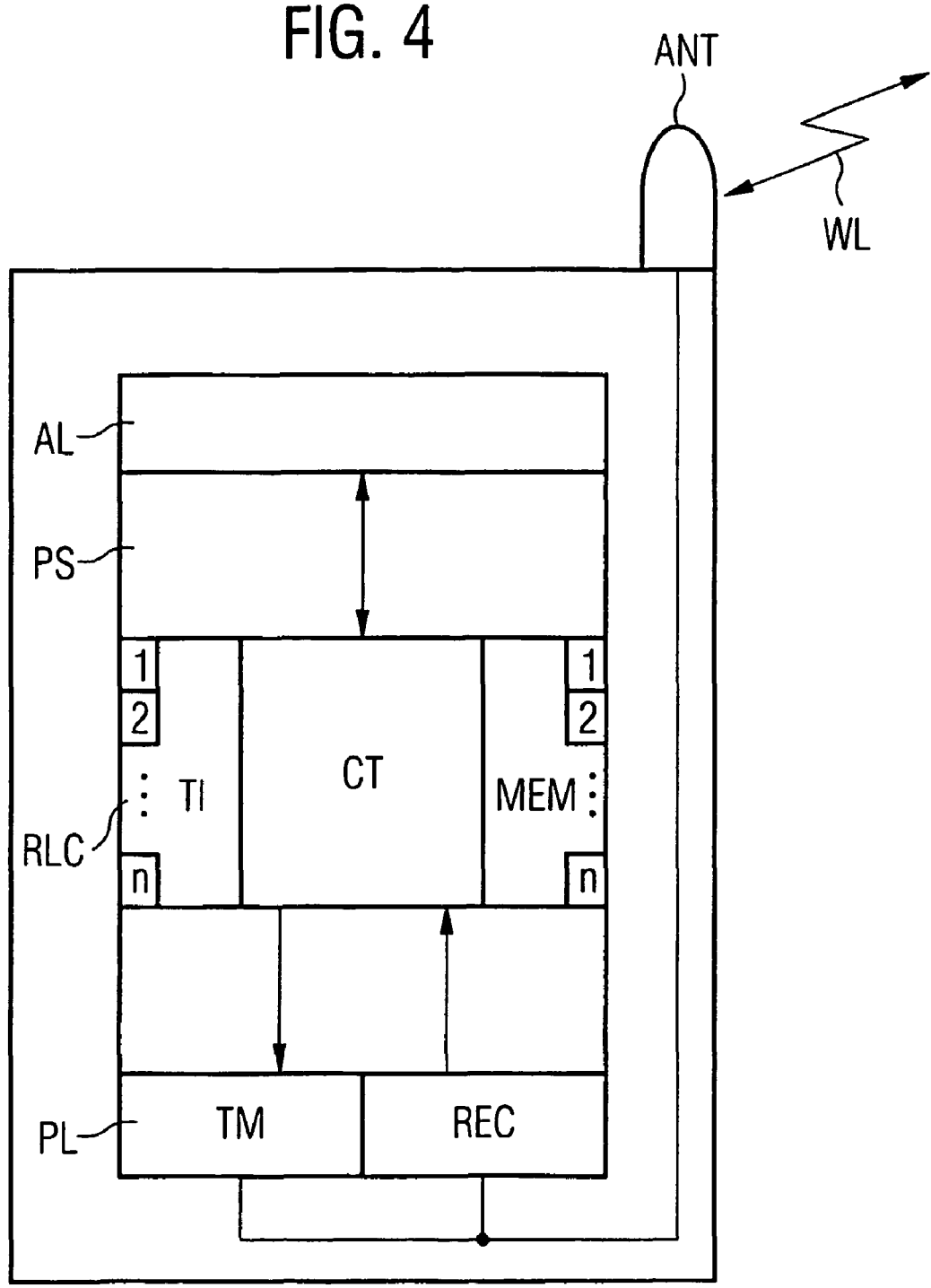
FIG. 4 shows a transmitter according to the invention

A transmitter according to the invention is depicted in FIG. 4. The hardware components are for example those of a customary radio base station or a user equipment and comprise for example a transmission unit and a reception unit, generally integrated in a transceiver unit, as well as a keyboard, display, microphone and loudspeaker in case of a user equipment. The hardware components are connected to a processing system PS implementing the protocol stack of the communication device. The stack includes beside other layers a physical layer PL, an RLC layer and an application layer AL. Wireless signals are received or emitted via an Antenna ANT and the signals are decoded and encoded for the wireless link WL in a transmission unit TM and a reception unit REC, respectively.

The processing system further comprises a group of timers $TI_1 \ldots TI_n$ and a memory MEM with sections $1, \ldots n$ corresponding to the timers TI and identifying the retransmitted data packets which are attributed to a specific timer $TI_i$. A control unit CT is adapted to perform the steps of the method as described above. Especially, the control unit CT determines from a status message received via reception unit REC whether a first retransmission of a first data packet is requested. The retransmission is performed using transmission unit TM and the control unit CT in the processing system PS initializes a timer TI according to the retransmission. The memory MEM stores which timer $TI_i$ is attributed to the first data packet, e.g. by storing the sequence number of the data packet in memory section i.

When the control unit CT in the processing system PS evaluates a further status message and detects at least one further data packet that is requested for a retransmission, it performs a scan of the memory MEM whether an identification corresponding to the further data packet is stored. If this is the case, control unit CT checks whether the timer TI attributed to the data packet is expired unless identifications of data packets are deleted from the memory upon expiry of the corresponding timer. If the timer is expired or the data packet is not identified in the memory, a retransmission of the further data packet is performed using transmission unit TM. The control unit CT then initializes a further timer according to the retransmission and the memory MEM stores which timer $TI_j$ is attributed to the further data packet.

The above embodiments admirably achieve the objects of the invention. However, it will be appreciated that departures can be made by those skilled in the art without departing from the scope of the invention which is limited only by the claims.

The invention claimed is:

1. A method for the transmission of data packets from a transmitter to a receiver, said method comprising the steps of:
   storing, by the transmitter, identification information relating to transmitted data packets by the transmitter;
   receiving one or more status messages from the receiver, said status messages requesting the retransmission of defective data packets received by the receiver;
   retransmitting said requested data packets according to the status messages, said retransmitting comprising the steps of:
      evaluating a first status message, said first status message including an identification of at least a first requested data packet;
      retransmitting said first requested data packet;
      initializing a timing unit as a function of the retransmission of said first requested data packet, said timing unit having a threshold attributable to said retransmission of said first requested data packet;
      evaluating at least a second status message, said second status message including an identification of a second requested data packet; and,
      when the identification of said second requested data packet corresponds to said first requested data packet, retransmitting said second requested data packet only when the timing unit has reached said threshold attributable to said retransmission of said first requested data packet.

2. The method according to claim 1, wherein the timing unit is a first timer, wherein the initialization is a starting of the first timer or the setting of the threshold according to the sending of the first data packet, and wherein the threshold is the expiry of the first timer.

3. The method according to claim 1, wherein the timing unit is a packet counter and wherein the threshold is a counter value.

4. The method according to claim 1, wherein at least two timing units or thresholds are attributable to data packet identifications and wherein the transmitter performs a check of thresholds for all timing units before performing a retransmission.

5. The method according to claim 1, wherein one timing unit or threshold is attributable to at least two retransmitted data packets.

6. The method according to claim 5, wherein a timing unit or threshold is attributable to the data packets retransmitted within one transmission time interval.

7. The method according to claim 1, wherein data packets are requested in sets.

8. The method according to claim 1, wherein the threshold for a timing unit corresponds to one round trip time.

9. The method according to claim 8, wherein the threshold is adapted by a correction value for the round trip time.

10. The method according to claim 1, wherein data can be transmitted over channels with different properties and wherein at least one threshold is determined according to the properties of the channel used for data transfer.

11. The method according to claim 1, wherein the data packets are radio link control protocol data units.

12. The method according to claim 1, wherein the data packets are packets of a physical layer in a protocol stack.

13. A transmitter for the transmission of data packets to a receiver, said transmitter comprising:
   means for storing identification information relating to transmitted data packets;
   means for receiving one or more status messages from the receiver, said status messages requesting the retransmission of defective data packets received by the receiver;
   means for retransmitting said requested data packets according to the status messages, said means for retransmitting comprising:
      means for evaluating a first status message, said first status message including an identification of at least a first requested data packet;
      means for retransmitting said first requested data packet;
      means for initializing a timing unit as a function of the retransmission of said first requested data packet, said timing unit having a threshold attributable to said retransmission of said first requested data packet;
      means for evaluating at least a second status message, said second status message including an identification of a second requested data packet; and,
      means for retransmitting, when the identification of said second requested data packet corresponds to said first requested data packet, said second requested data packet only when the timing unit has reached said threshold attributable to said retransmission of said first requested data packet.

14. The transmitter according to claim 13, wherein the timing unit is a first timer, wherein the initialization is a starting of the first timer or the setting of the threshold according to the sending of the first data packet, and wherein the threshold is the expiry of the first timer.

15. The transmitter according to claim 13, wherein the timing unit is a packet counter and wherein the threshold is a counter value.

16. The transmitter according to claim 13, wherein at least two timing units or thresholds are attributable to data packet identifications and wherein the transmitter performs a check of thresholds for all timing units before performing a retransmission.

17. The transmitter according to claim 13, wherein one timing unit or threshold is attributable to at least two retransmitted data packets.

18. The transmitter according to claim 17, wherein a timing unit or threshold is attributable to the data packets retransmitted within one transmission time interval.

19. The transmitter according to claim 13, wherein data packets are requested in sets.

20. The transmitter according to claim 13, wherein the threshold for a timing unit corresponds to one round trip time.

21. The transmitter according to claim 20, wherein the threshold is adapted by a correction value for the round trip time.

22. The transmitter according to claim 13, wherein data can be transmitted over channels with different properties and wherein at least one threshold is determined according to the properties of the channel used for data transfer.

23. The transmitter according to claim 13, wherein the data packets are radio link control protocol data units.

24. The transmitter according to claim 13, wherein the data packets are packets of a physical layer in a protocol stack.

* * * * *